E. A. HILL.
COMBINED TRACK AND HANGER FOR CAR DOORS.
APPLICATION FILED JUNE 18, 1910.
1,001,030.
Patented Aug. 22, 1911.
2 SHEETS—SHEET 1.
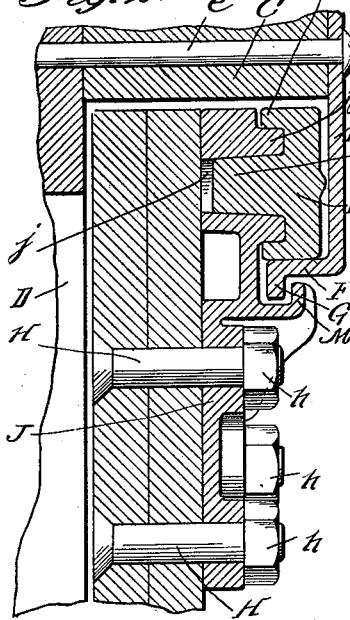
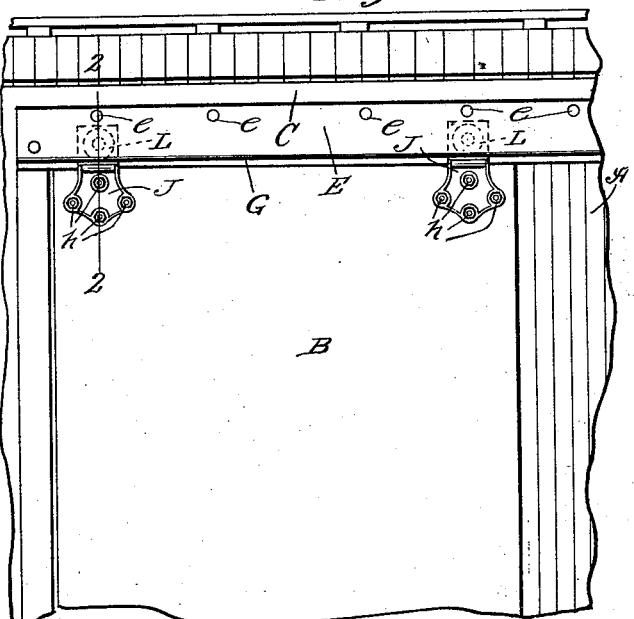
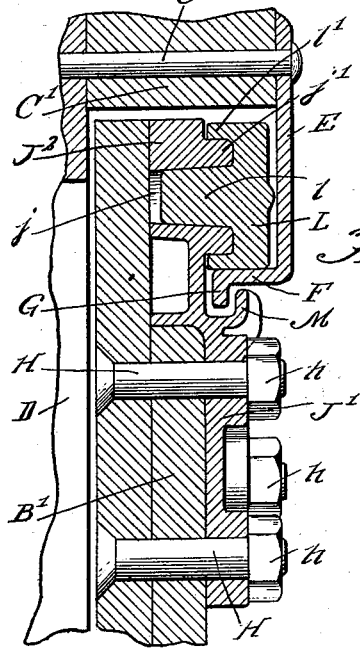
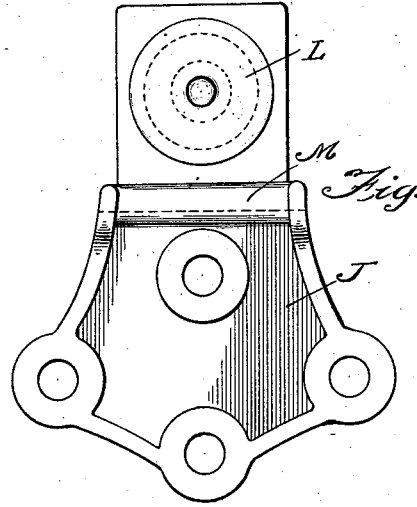
Witnesses:
Inventor:
Edward A. Hill
By O. R. Barnett
Atty.

E. A. HILL.
COMBINED TRACK AND HANGER FOR CAR DOORS.
APPLICATION FILED JUNE 18, 1910.

1,001,030.

Patented Aug. 22, 1911.

2 SHEETS—SHEET 2.

Witnesses:

Inventor:
Edward A. Hill
By O. R. Barnett.
Atty.

UNITED STATES PATENT OFFICE.

EDWARD A. HILL, OF CHICAGO, ILLINOIS, ASSIGNOR TO CHICAGO CAR DOOR COMPANY, OF CHICAGO, ILLINOIS, A CORPORATION OF ILLINOIS.

COMBINED TRACK AND HANGER FOR CAR-DOORS.

1,001,030.   Specification of Letters Patent.   Patented Aug. 22, 1911.

Application filed June 18, 1910. Serial No. 567,661.

*To all whom it may concern:*

Be it known that I, EDWARD A. HILL, a citizen of the United States, residing at Chicago, in the county of Cook and State of Illinois, have invented certain new and useful Improvements in Combined Tracks and Hangers for Car-Doors, of which the following is a specification.

My invention relates to combined track and hanger for car doors and the invention has for its object to provide a form of apparatus of this character consisting of but a few simple integral parts compactly arranged and strongly and durably made so that the apparatus is cheap to manufacture, easy to put together and repair, and unlikely to get out of order.

A further object of the invention is to provide apparatus of this sort which is extremely compact so that it does not increase the width of the car by projecting any appreciable amount from the side thereof.

A further object of the invention is to provide a construction of such a character that the crack which intervenes the top of the door and the door frame is covered and protected so that rain, snow, dirt, cinders, sparks and the like can not enter the car at this place; and in which the movable parts, for example the trolley wheel and the parts with which it engages, are adequately housed and protected against the weather and against dirt, cinders and the like, this arrangement facilitating the opening and closing of the door and adding durability to the apparatus.

The invention has for further objects such other new and improved arrangements, constructions and devices, as will be described in the following specification and claimed in the claims appended thereto.

The invention is shown in certain preferred embodiments in the accompanying drawings, wherein—

Figure 5:
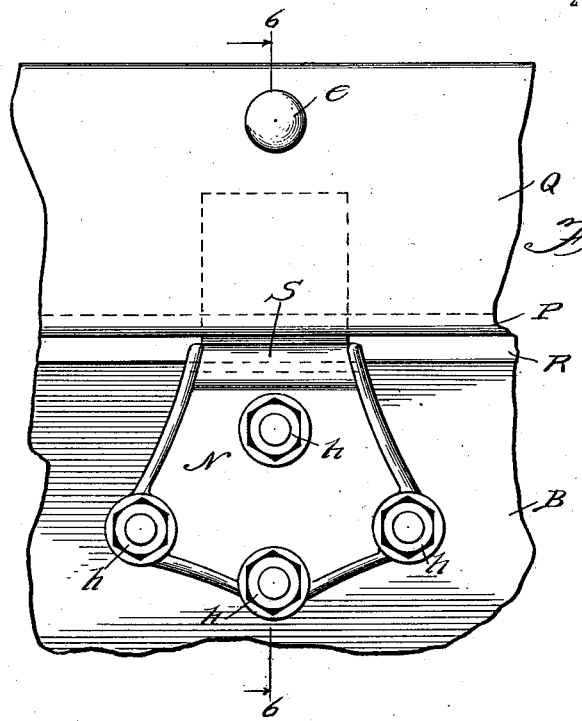
Figure 6:
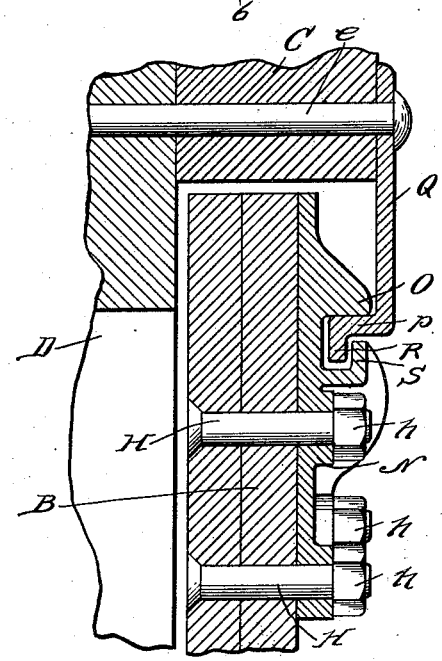

Figure 1 is a fragmentary side elevation of a freight car showing the general arrangement of the devices of which my invention is composed. Fig. 2 is an enlarged sectional view taken on line 2—2 of Fig. 1. Fig. 3 is a front view of the hanger and trolley wheel. Fig. 4 is a view similar to Fig. 2, showing a modified construction. Fig. 5 is a fragmentary elevation illustrating another modification. Fig. 6 is a sectional view taken on line 6—6 of Fig. 5.

Like characters of reference indicate like parts in the several figures of the drawings.

Referring first to Figs. 1 to 3 inclusive, A designates the side wall of the car, B the door which is adapted to move back and forth on the outside of the car, C a timber which projects from the side of the car above the door-way, indicated at D (Fig. 2), and E a track bar consisting of a vertical portion secured to the timber C by the bolts $e$, and a horizontal or tread-forming portion F which, at its edge is formed with the depending flange G. To the face of the door are secured by means of the bolts H and nuts $h$, the hangers J, the hangers being alike and each of them formed with a perforation $j$ which is surrounded by a circular projection or boss $j'$. A trolley wheel L is provided for each hanger having preferably the integral axle $l$ which extends into the perforation $j$ and the inwardly projecting flange $l'$ which surrounds the boss $j'$. Another form of trolley wheel than the one shown might be employed, and no claim is laid herein to the construction of the trolley wheel taken by itself, as this construction is claimed in my co-pending application Serial No. 539,778, filed January 24, 1910. The hanger is formed with a lip M which stands in front of the flange G of the track bar; the bracket in effect being grooved for the flange G. By this arrangement it will be seen the trolley wheel and its bearing are completely housed and protected against the weather and against dirt and cinders. No water can reach the upper surface of the track F, and, therefore, there is no danger of the door being clogged by ice in winter time. Furthermore, the crack above the top of the door is covered by the vertical portion E of the track bar so as to prevent rain, snow, dust, sparks, cinders and the like from entering the car at this point. In the preferred construction shown the trolley wheel is a single integral piece of metal and is held in its bearing by the vertical portion of the track bar and by this alone. This does away with separate bolts and other devices for securing the trolley wheel to the hanger. The door is kept in proper relation with the hanger so that the trolley wheel can not be displaced from its bearing, by means of the lip M which stands in front of flange G on the track bar.

The arrangement illustrated in Fig. 4 is precisely the same as that shown in the preceding figures, except that the hanger J' is formed with its upper end J² offset into the body of the door B'. This narrows the construction of the apparatus, a narrower timber C' being used instead of the timber C shown in the preceding figures.

In Figs. 5 and 6 I have illustrated an arrangement similar to those shown in Figs. 1 to 4 inclusive, but which does away with the trolley wheels. In these figures a hanger N is provided having a projection O which slides directly on the horizontal portion P of the track bar Q. The track bar has depending from its inner edge the flange R, forwardly of which is a lip S formed on the hanger N. In other respects, the construction is the same as in the preceding figures.

As the devices, constructions and arrangements shown and described might be somewhat modified, without departing from my invention, I do not limit myself to the particulars shown and described except so far as the same are made limitations on certain of the claims.

I claim:

1. The combination with a track bar formed with an attaching flange, a track extending inwardly therefrom and a flange depending from the inner edge of the track, of a hanger adapted to be movably sustained on the track and formed with an upwardly projecting lip which extends under said track and in front of said depending flange.

2. The combination with a door, of a track bar formed with an attaching flange, a track which extends inwardly therefrom, and a flange which projects from the track, inwardly of said attaching flange, means secured to the door for movably sustaining the door on said track, and a lip carried by the door and adapted to have a sliding engagement with said projecting flange.

3. In a combined track and hanger for a sliding car door, the combination with a track bar formed with an attaching flange adapted to be attached to a car above the hanger and extending downwardly in front of the upper portion of the hanger, a track flange extending inwardly from said attaching flange, and a depending flange extending from the track flange inwardly of the attaching flange, of a hanger adapted to be attached to the door so as to be wholly located outside of the inner face of the door and arranged to be movably supported on said track flange, said hanger being arranged wholly within the extreme outer face of said attaching flange and being provided with a lip adapted to operate in sliding engagement with the outer face of said depending flange on the track bar.

EDWARD A. HILL.

Witnesses:
P. H. TRUMAN,
E. L. BREIDERT.

---

Copies of this patent may be obtained for five cents each, by addressing the "Commissioner of Patents, Washington, D. C."